W. R. McKEEN, Jr.
TRUCK CONSTRUCTION.
APPLICATION FILED MAY 18, 1909.
1,191,979.
Patented July 25, 1916.
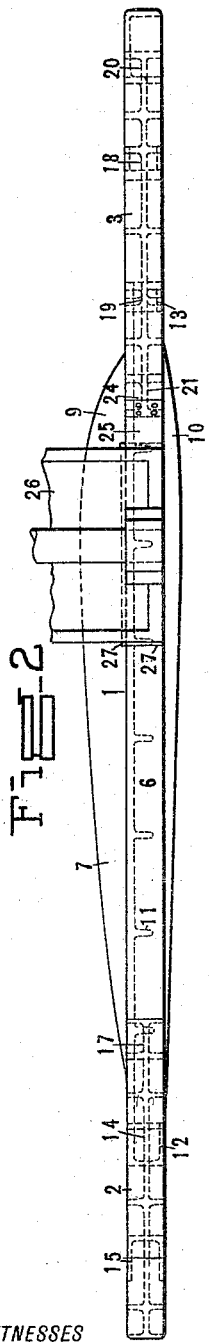
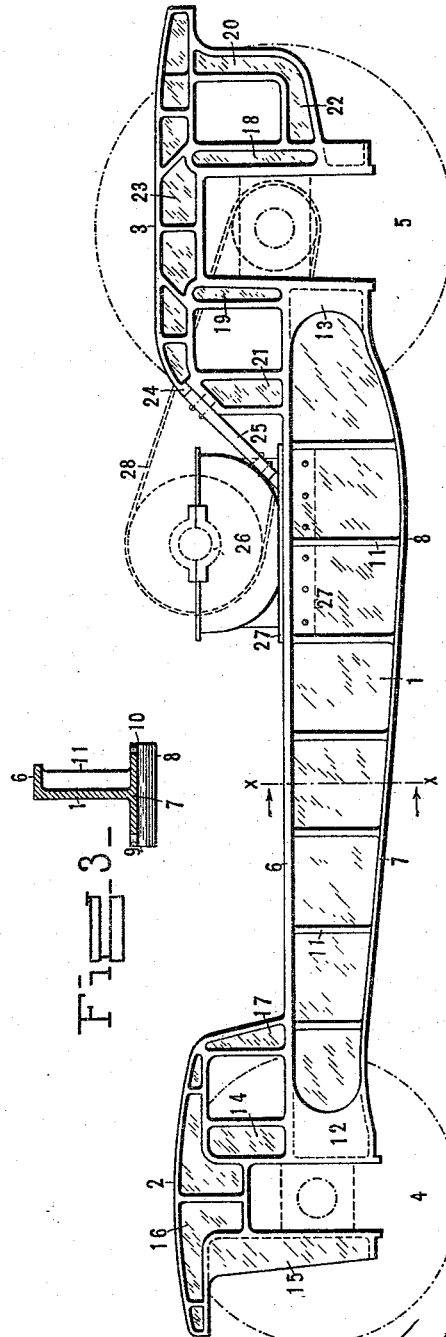
WITNESSES
INVENTOR
ATTORNEYS

UNITED STATES PATENT OFFICE.

WILLIAM RILEY McKEEN, JR., OF OMAHA, NEBRASKA, ASSIGNOR TO McKEEN MOTOR CAR COMPANY, OF OMAHA, NEBRASKA, A CORPORATION OF NEW JERSEY.

TRUCK CONSTRUCTION.

1,191,979. Specification of Letters Patent. Patented July 25, 1916.

Application filed May 18, 1909. Serial No. 496,853.

*To all whom it may concern:*

Be it known that I, WILLIAM R. McKEEN, Jr., a citizen of the United States, residing at Omaha, in the county of Douglas and State of Nebraska, have invented certain new and useful Improvements in Truck Construction, of which the following is a full, clear, and exact description, such as will enable others skilled in the art to which it appertains to make and use the same.

This invention relates to truck construction.

One of the objects thereof is to provide a strong, rigid truck characterized by simple construction and an economical use of metal.

Another object is to provide a practical truck of the above type peculiarly adapted to support a driving motor under all conditions of use.
Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, wherein is shown one of various possible embodiments of this invention, Figure 1 is a side elevation thereof; Fig. 2 is a plan view; Fig. 3 is a detailed sectional view taken substantially along the line $x$—$x$, Fig. 1.
Similar reference characters refer to similar parts throughout the several views of the drawing.

As conducive to a clearer understanding of certain features of this invention, it may here be noted that a railway truck, and particularly a railway motor truck, is exposed to the severest use. It is not only subjected to the constant jarring and vibration, due to running over the track, in a much severer degree than the car body, which is cushioned by additional springs, but is confined to comparatively small dimensions and is subjected to heavy loads aside from its own weight; and its ability to bear up under these conditions, is of vital importance. Accordingly, the construction of apparatus of this nature must not only be compact, but must be strong and stiff to a high degree. In meeting these conditions there is a tendency to a heavy type of construction with a correspondingly large cost and materially increased weight of car, and much of this metal is practically idle in the use of the truck.

One of the dominant aims of this invention is to so form and dispose the portions of a truck with respect to the various stresses which it is to encounter, that all metal is utilized to its full value, with a proper factor of safety, at every stage in the practical use of a truck. This and other objects are achieved in constructions of the nature of that hereinafter described.

Referring now to the accompanying drawing, there is shown a truck side-bar 1 cast integrally with the pedestals 2 and 3. Within these pedestals are positioned the axle-boxes of wheels 4 and 5, the latter being of larger diameter and adapted to serve as drivers. As above noted, this entire side of the truck is formed integrally, and is of flanged construction, the portions between the flanges being in general filled in by webs, as indicated upon the drawing.

Side-bar 1 is provided with an upper flange 6 and a lower flange 7, and is of varying depth, the lower flange 7 following a curved line to provide a maximum depth substantially at 8. This flange 7 also tapers horizontally, as indicated in Fig. 2 of the drawing, being extended both inwardly and outwardly with respect to the upper flange 6. The inwardly extending portion 9 is preferably somewhat greater than the outwardly extending portion 10, in order to enhance the compactness of the truck as a whole, and a maximum width of flange 7, as well as depth of the side-bar, is provided substantially at 8. Vertical webs 11 are disposed between flanges 6 and 7, as indicated in the drawing, and the ends of the side-bar terminate in pockets 12 and 13 respectively.

Pedestal 2 comprises the upright portions 14 and 15 spaced one from another, and a transverse portion 16 having projecting ends, the inner of which is connected by the portion 17 of the side-bar.

Pedestal 3 comprises the upright portions 18 and 19 spaced one from another and having spaced therefrom further upright portions 20 and 21. Portions 18 and 20 are connected as at 22, and portions 19 and 21 join the end of the side-bar 1. An upper transverse member 23 connects the upper ends of these several portions and is so formed as to provide a shoulder 24 against which an inclined strut or brace 25 is rested. This brace is bolted in position upon the portion 21 at its upper end, and at its lower end interlocks with a shoulder upon an integral casting 26 and is bolted thereto. Casting 26 serves as an engine or motor support and is provided with horizontal and vertical flanges 27 as shown, fitting about the side-bar of the truck. This motor preferably drives, as through the sprocket chain 28, the wheels 5, and thus propels the truck.

It may here be noted that, although many advantages reside in the integral type of construction shown, nevertheless the term "side-bar" is used throughout in a broad sense to cover a built-up as well as an integral construction.

In the use of the truck it will be seen that the load which is largely concentrated adjacent the heavy casting 26 and motor, preferably of the internal combustion type, mounted thereon, is supported by a member peculiarly adapted to bear and transmit this weight. The side-bar not only presents a maximum depth adjacent this point, but the lower flange thereof presents a maximum width, and thus extreme stiffness is attained with a minimum use of metal. The upper flange, which is subjected in use largely to compressive stresses, is well adapted to resist the same, and the lower portion of the side-bar is peculiarly fitted to stand its tensile stress, which with a given quality of steel is more severe than stress of compressive character. Moreover, the tendency of the pedestals to rock inwardly toward the upper surface of the side-bar is well met by the supporting portions 17 and 21, and in the case of the pedestal 3 additional support is given by the strut 25 acting as a compression member.

It will be observed that the top chord or flange of my side bars presents a continuous unbroken surface without bend or deflection horizontally or vertically, and that the vertical web of each side bar lies directly beneath said top flange, and is likewise in one continuous vertical plane without break or deflection, hence is best adapted to receive and carry stresses of all kinds and in all directions. It will also be seen that the motor support or base rests upon the top flanges, and has vertical webs or flanges which are riveted or otherwise secured to the vertical webs of the side bars. It will therefore be seen that instead of weakening the side bars by making seats or depressions therein, or deflections thereof to receive the cross connections, I preserve intact the full strength of the side bar, and give it its greatest measurements directly beneath the motor support, which adds to the strength of the side bars by reason of its own depth, and most effectively braces the same by reason of its rectangular and trough or box-like form, and the manner of connecting its ends with the side bars. This is of great importance in a motor-supporting truck, and particularly where, as is contemplated in the present instance, a motor of considerable weight and power is used, and the power cylinders are arranged vertically. Additional cross connections may, of course, be employed. By this construction the motor support is caused to serve a double function, that is to say, it acts as a motor support and as a means of connecting and directly bracing the side bars of the truck, without in any manner necessitating or involving deflection, recessing, or other weakening of the side bars, or either of them. It is to be understood that both sides of the truck are identical, one only being set forth in order to avoid a useless encumbrance of the description and drawing. It will thus be seen that there is provided a construction in which the aims of this invention are achieved and the above and other advantages attained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of generic and specific features of the invention herein described, and all statements of the scope of the invention which, as a matter of language, might be said to fall therebetween.

Having described my invention, what I claim as new and desire to secure by Letters Patent is:

1. In truck construction, in combination, a pair of side bars each having a pedestal at one end thereof extending upwardly above the body of said side bars; a motor support connecting the side bars and resting thereon; and an inclined brace extending downward from the upper part of each of said pedestals to the motor support, and secured at its ends to said pedestals and motor support, respectively.

2. In truck construction, a pedestal comprising four spaced, upright portions, means connecting the lower ends of said portions in pairs, and means connecting together the upper ends of said four portions.

3. In truck construction, a pedestal comprising four spaced upright portions, means connecting the lower ends of said portions in pairs, and means connecting together the upper ends of said four portions, said portions and said connecting means being of flanked construction.

4. In truck construction, in combination, a side-bar, a pair of spaced, upright portions one of which is connected with said side-bar, means connecting said upright portions and projecting at one end over said side-bar, and means connecting said projecting end with said side-bar.

5. In truck construction, in combination, a side-bar, a pair of spaced, upright portions one of which is connected with said side-bar, means connecting said upright portions and projecting at one end over said side-bar, means connecting said projecting end with said side-bar, and an inclined brace extending from said projecting end to said side-bar.

6. In truck construction, in combination, a side-bar, a pair of spaced, upright portions one of which is connected with said side-bar, means connecting said upright portions and projecting at one end over said side-bar, and an inclined brace connecting said projecting end with said side-bar.

7. In truck construction, in combination, a side-bar, a pair of spaced, upright portions one of which is connected with said side-bar, means connecting said upright portions and projecting at both ends, means connecting one of said projecting ends with said side-bar, and means connecting the other of said projecting ends with one of said upright portions.

8. In truck construction, in combination, a side bar, pedestals at each end thereof, wheels mounted adjacent said pedestals, a brace extending downwardly from the top of one pedestal toward the center of said side bar, and a source of power mounted on said side bar adjacent said brace, said side bar being of increased width and depth beneath said source of power.

9. In truck construction, in combination, a side-bar, a source of power mounted thereon, said side-bar being of increased depth beneath said source of power, a pair of spaced, upright portions one of which is connected with said side-bar, means connecting said upright portions and projecting at one end over said side-bar, and means connecting said projecting end with said side-bar adjacent said source of power.

10. In truck construction, in combination, a side-bar, a source of power mounted thereon, said side-bar being of increased depth beneath said source of power, a pair of spaced, upright portions one of which is connected with said side-bar, means connecting said upright portions and projecting at one end over said side-bar, and an inclined brace interposed between said projecting end and said side-bar adjacent said source of power.

11. In truck construction, in combination, a side-bar, an engine bed mounted thereon, a pedestal, and an inclined brace interposed between said bed and said pedestal.

12. In truck construction, in combination, a side-bar, a pedestal, and an inclined brace interposed between said pedestal and said side-bar, said side-bar being of increased depth beneath the end of said brace.

13. In truck construction, in combination, a side bar having upper and lower flanges, and upright flanges interposed therebetween, said side-bar being tapered toward each end from an intermediate point, and said lower flange being tapered in the same direction, pedestals formed integral with the ends of said side-bar, and an inclined brace extending from one of said pedestals to said side-bar.

In testimony whereof I affix my signature, in the presence of two witnesses.

WILLIAM RILEY McKEEN, Jr.

Witnesses:
A. H. FETTERS,
E. B. DAILEY.

Copies of this patent may be obtained for five cents each, by addressing the "Commissioner of Patents, Washington, D. C."